US011697771B2

(12) United States Patent
Huang et al.

(10) Patent No.: US 11,697,771 B2
(45) Date of Patent: Jul. 11, 2023

(54) SYSTEM FOR PRODUCING BIOMASS VINEGAR AND CHARCOAL

(71) Applicant: National Chung Cheng University, Minsyong Township, Chiayi County (TW)

(72) Inventors: Shi-Ming Huang, Minsyong Township, Chayi County (TW); Chih-Yuan Kuo, Minsyong Township, Chiayi County (TW)

(73) Assignee: NATIONAL CHUNG CHENG UNIVERSITY, Chiayi County (TW)

( * ) Notice: Subject to any disclaimer, the term of this patent is extended or adjusted under 35 U.S.C. 154(b) by 0 days.

(21) Appl. No.: 17/572,313

(22) Filed: Jan. 10, 2022

(65) Prior Publication Data

US 2023/0045703 A1 Feb. 9, 2023

(30) Foreign Application Priority Data

Aug. 5, 2021 (TW) .................................. 110128959

(51) Int. Cl.
*C10B 53/02* (2006.01)
*C10B 49/02* (2006.01)
*C10B 51/00* (2006.01)
*C10C 5/00* (2006.01)

(52) U.S. Cl.
CPC .............. *C10B 53/02* (2013.01); *C10B 49/02* (2013.01); *C10B 51/00* (2013.01); *C10C 5/00* (2013.01)

(58) Field of Classification Search
CPC ......... C10B 49/02; C10B 51/00; C10B 53/02; C10C 5/00
See application file for complete search history.

(56) References Cited

U.S. PATENT DOCUMENTS

| 8,986,507 B2 * | 3/2015 | Schottdorf | C10B 49/06 201/3 |
| 10,160,911 B2 * | 12/2018 | Aupperle | C10B 49/02 |
| 11,135,728 B2 * | 10/2021 | Olander | C10B 25/22 |
| 2008/0124791 A1 * | 5/2008 | Bucci | B65F 1/06 435/290.4 |

(Continued)

FOREIGN PATENT DOCUMENTS

CN 101020827 A 8/2007

OTHER PUBLICATIONS

Chen W, CN-108949207-A, Dec. 2018, Search Machine Translation and Original Foreign Patent Document. (Year: 2022).*

(Continued)

*Primary Examiner* — Jonathan Miller
(74) *Attorney, Agent, or Firm* — Lando & Anastasi, LLP

(57) ABSTRACT

A system for producing biomass vinegar and charcoal includes a furnace, which has an outer shell defining a lower combustion chamber and an upper heating chamber, and an inner tank removably received in the heating chamber. A cooling pond has a cooling region to accommodate the inner tank. A condenser in a collection barrel condenses smoke gases from the inner tank to produce biomass vinegar. A first temperature sensing pipeline removably connects the inner tank, After the biomass is carbonized, the first temperature sensing pipeline is removed from the inner tank, and the inner tank is moved to the cooling region to be cooled by a sprinkler.

12 Claims, 4 Drawing Sheets

(56) References Cited

U.S. PATENT DOCUMENTS

| | | | | |
|---|---|---|---|---|
| 2012/0079762 A1* | 4/2012 | Schottdorf | .............. | C10B 39/02 |
| | | | | 422/187 |
| 2015/0252267 A1* | 9/2015 | Licht | ....................... | C10L 5/363 |
| | | | | 201/8 |
| 2018/0282628 A1* | 10/2018 | Aupperle | .................. | F23L 5/02 |
| 2019/0093018 A1* | 3/2019 | Taniguro | ................ | C10B 53/02 |

OTHER PUBLICATIONS

Search Report appended to an Office Action, which was issued to Taiwanese counterpart application No. 110128959 by the TIPO dated Jan. 10, 2022, with an English translation thereof.

\* cited by examiner

SYSTEM FOR PRODUCING BIOMASS VINEGAR AND CHARCOAL

CROSS-REFERENCE TO RELATED APPLICATION

This application claims priority to Taiwanese Invention Patent Application No. 110128959, filed on Aug. 5, 2021.

FIELD

The disclosure relates to a system for producing biomass vinegar and charcoal, and more particularly, to a system for producing biomass vinegar and charcoal by continuously operating a batch-type charcoal furnace.

BACKGROUND

A carbonization apparatus, as disclosed Chinese Patent Application Publication No. 109111933A, includes a carbonization furnace, a condensing unit connected to the carbonization furnace, and a smoke processing unit connected to the condensing unit. The carbonization furnace includes a tank body for containing wooden materials, a combustion chamber to heat the tank body, and a gas conveying pipe connected to the tank body. The condensing unit communicates with the gas conveying pipe and includes a cooling water inlet, a cooling water outlet, and a wood vinegar drainage outlet. The smoke processing unit communicates with the wood vinegar drainage outlet. However, when the carbonizing process in the carbonization furnace is completed, the carbonized products in the tank body can be unloaded only after the tank body is cooled down, thereby rendering the process inconvenient. Because the carbonization furnace is heated by burning old used wood pieces in the combustion chamber, adjustment of fire power difficult, and heating and carbonization efficiencies are insufficient, thereby lowering production efficiency.

SUMMARY

Therefore, an object of the disclosure is to provide a system that can alleviate at least one of the drawbacks of the prior art for producing bamboo vinegar and bamboo charcoal.

According to the disclosure, a system for producing biomass vinegar and charcoal is provided. The system includes a furnace, a cooling unit, a control unit, and a collecting unit.

The furnace includes an outer shell and at least one inner tank removably received in the outer shell. The outer shell has a combustion chamber wall, a heating chamber wall extending upwardly from the combustion chamber wall, a partition wall extending transversely at a junction of the combustion and heating chamber walls, a combustion chamber defined by the combustion chamber wall and the partition wall, and a heating chamber defined by the partition wall and the heating chamber wall. The at least one inner tank has a top cover removably covering the heating chamber wall and closing the heating chamber, and a barrel removably engaged with the top cover and disposed in the heating chamber. The barrel has a receiving space configured to receive biomass. The top cover has two smoke discharge openings communicating with the receiving space.

The cooling unit includes a cooling pond and a sprinkler disposed in the cooling pond. The cooling pond has a cooling region to accommodate the at least one inner tank.

The control unit includes a first temperature sensing module and a first temperature sensing pipeline connecting the first temperature sensing module and one of the smoke discharge openings.

The collecting unit includes a collection barrel disposed downstream of the other one of the smoke discharge openings, a condenser disposed in the collection barrel, and a first collection pipeline connected to the collection barrel and the other one of the smoke discharge openings.

When the biomass in the at least one inner tank is heated, smoke gases pass through the first collection pipeline to the collection barrel, and the condenser condenses the smoke gases to produce biomass vinegar in the collection barrel, and the first temperature sensing module detects a temperature of the smoke gases flowing into the first temperature sensing pipeline.

After the biomass is carbonized, the first temperature sensing pipeline and the first collection pipeline are detached from the at least one inner tank, and the at least one inner tank is moved to the cooling region to be cooled by the sprinkler.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Figure 1:
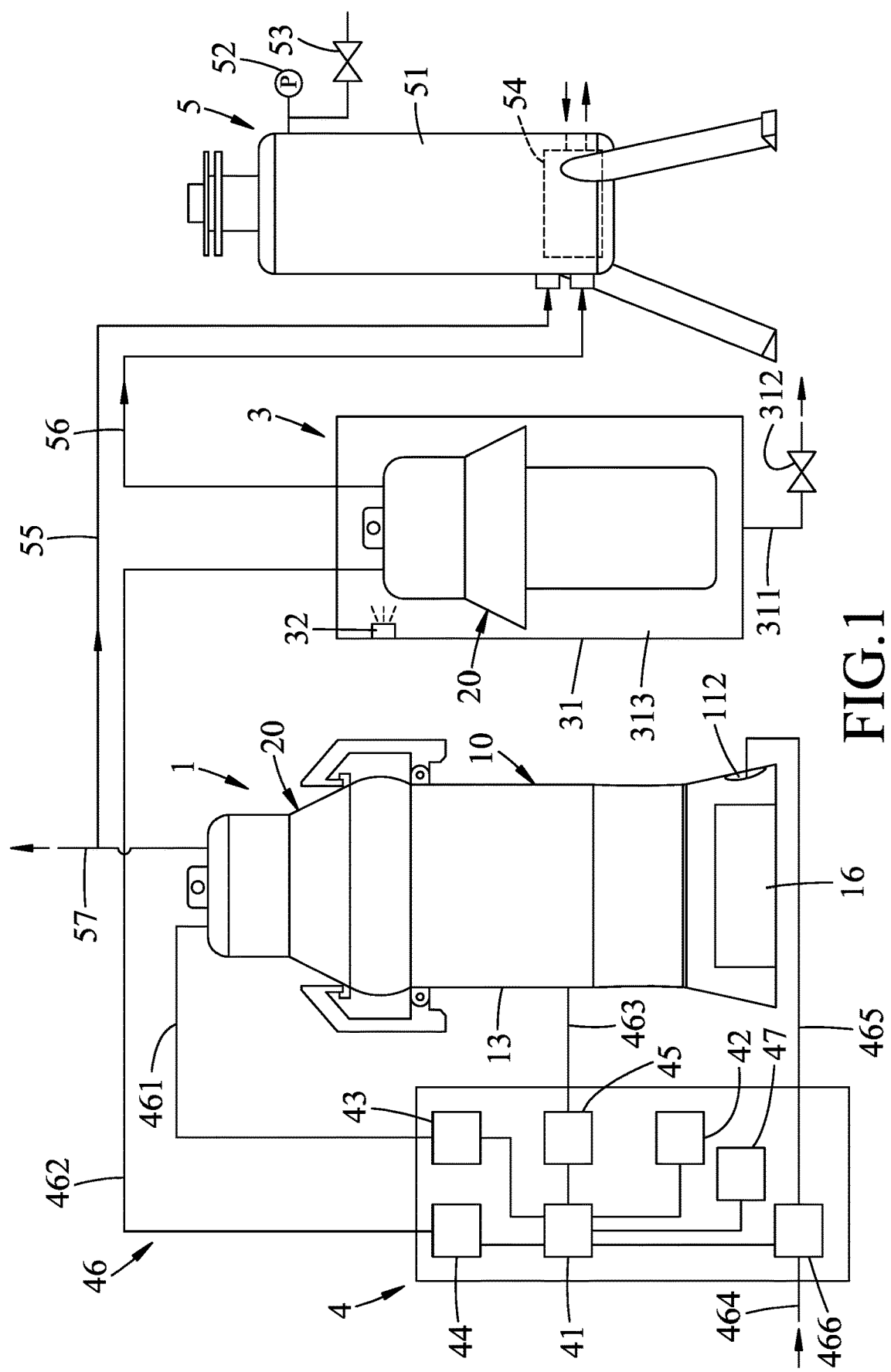
FIG. 1 is a schematic view illustrating a system for producing biomass vinegar and charcoal according to an embodiment of the disclosure.

FIG. 1 illustrates a system for producing biomass vinegar and charcoal according to an embodiment of the disclosure. The system includes a furnace 1, a cooling unit 3, a control unit 4, and a collecting unit 5.

The furnace 1 includes an outer shell 10 and two inner tanks 20 which can be removably and exchangeably placed in the outer shell 10 and the cooling unit 3. Particularly, after one of the inner tanks 20 is unloaded from the outer shell 10 and moved into the cooling unit 3 for cooling, the other inner tank 20 may be loaded with biomass and placed into the outer shell 10 to undergo carbonization. While the number of the inner tanks 20 is exemplified as two in this embodiment, it is not limited only hereto and can be one or more than 2.

Figure 2:
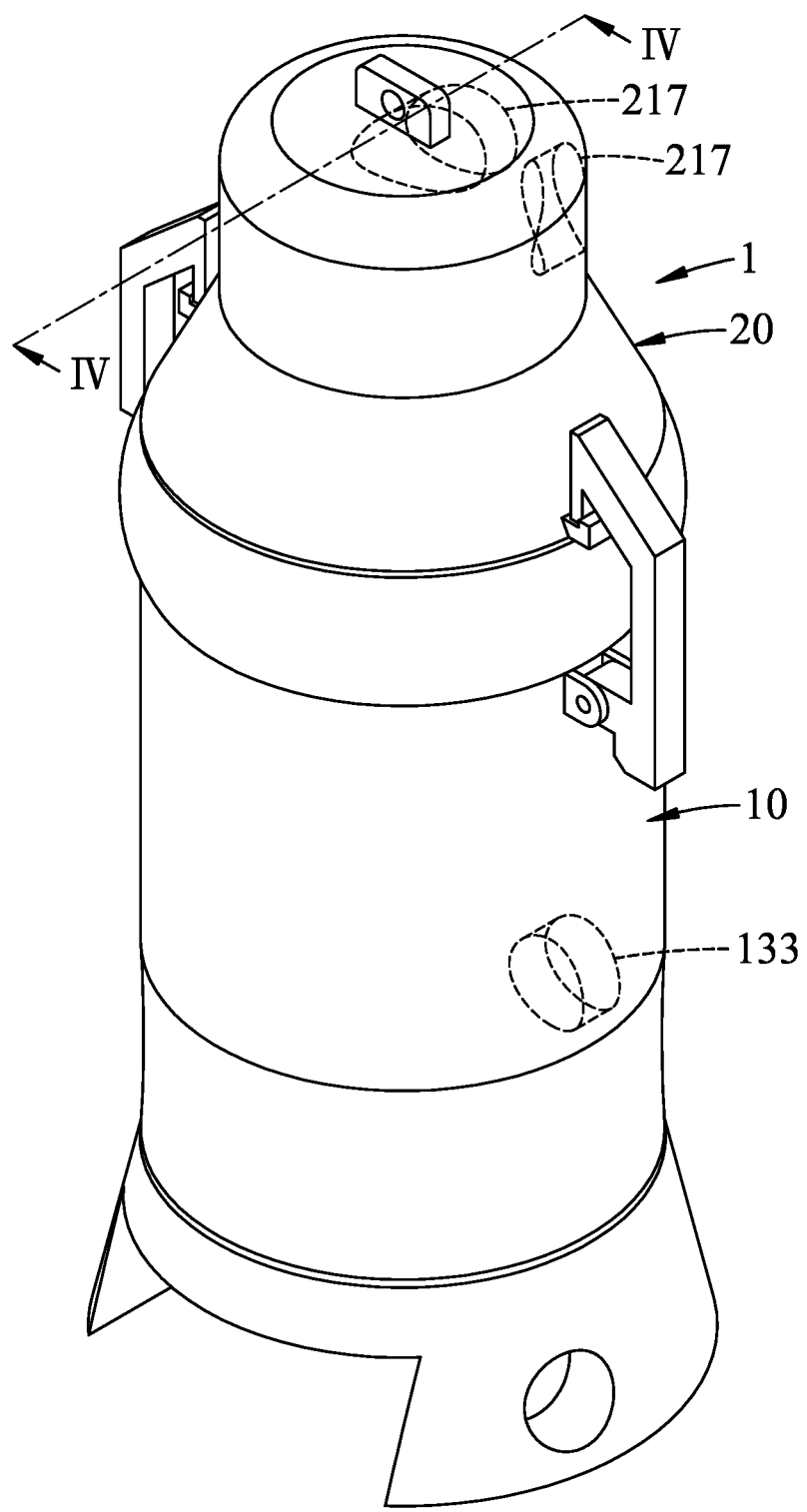
FIG. 2 is a perspective view of the embodiment illustrating a furnace of the system.
Figure 3:
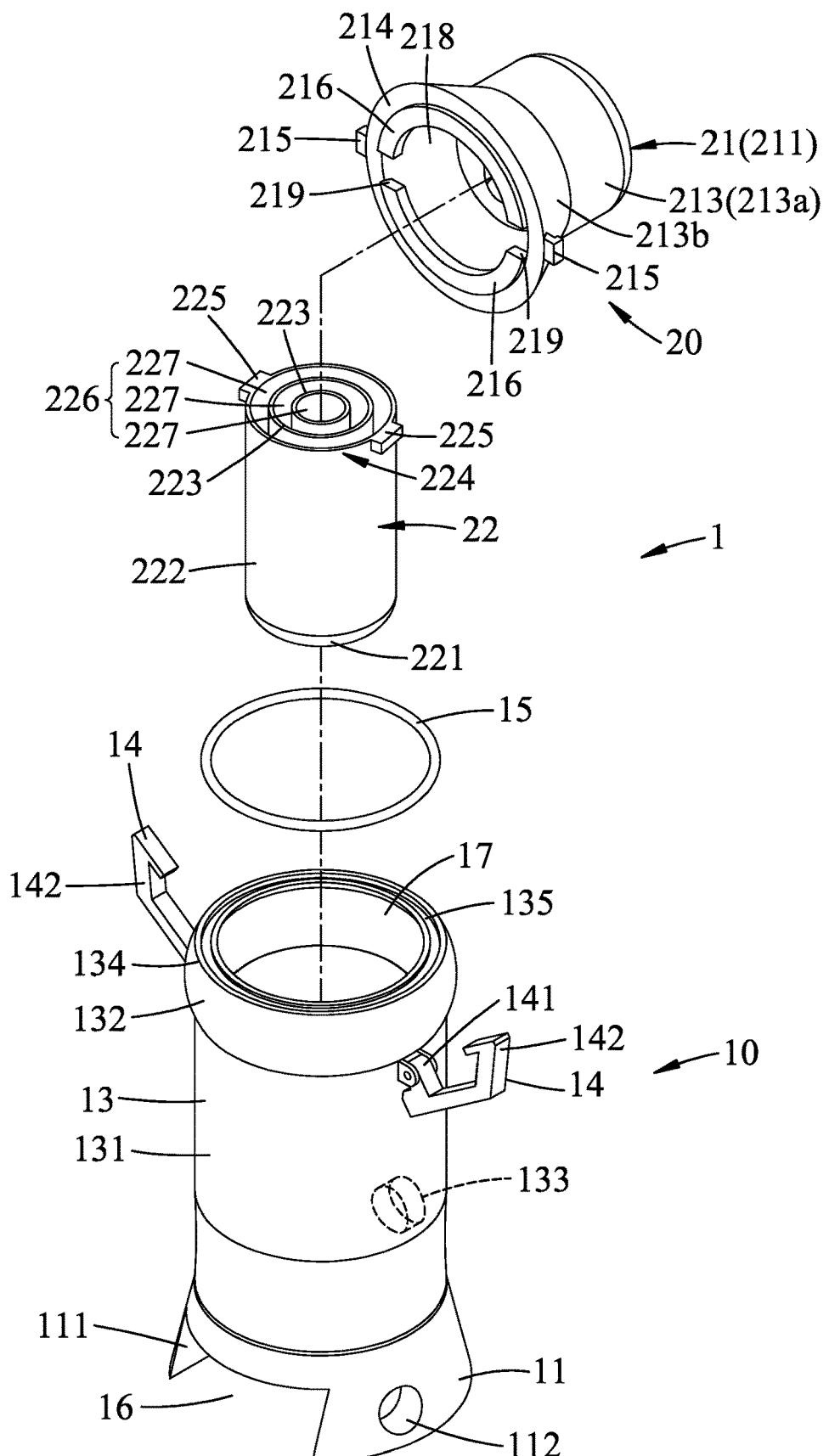
FIG. 3 is an exploded perspective view illustrating the furnace of the embodiment.
Figure 4:
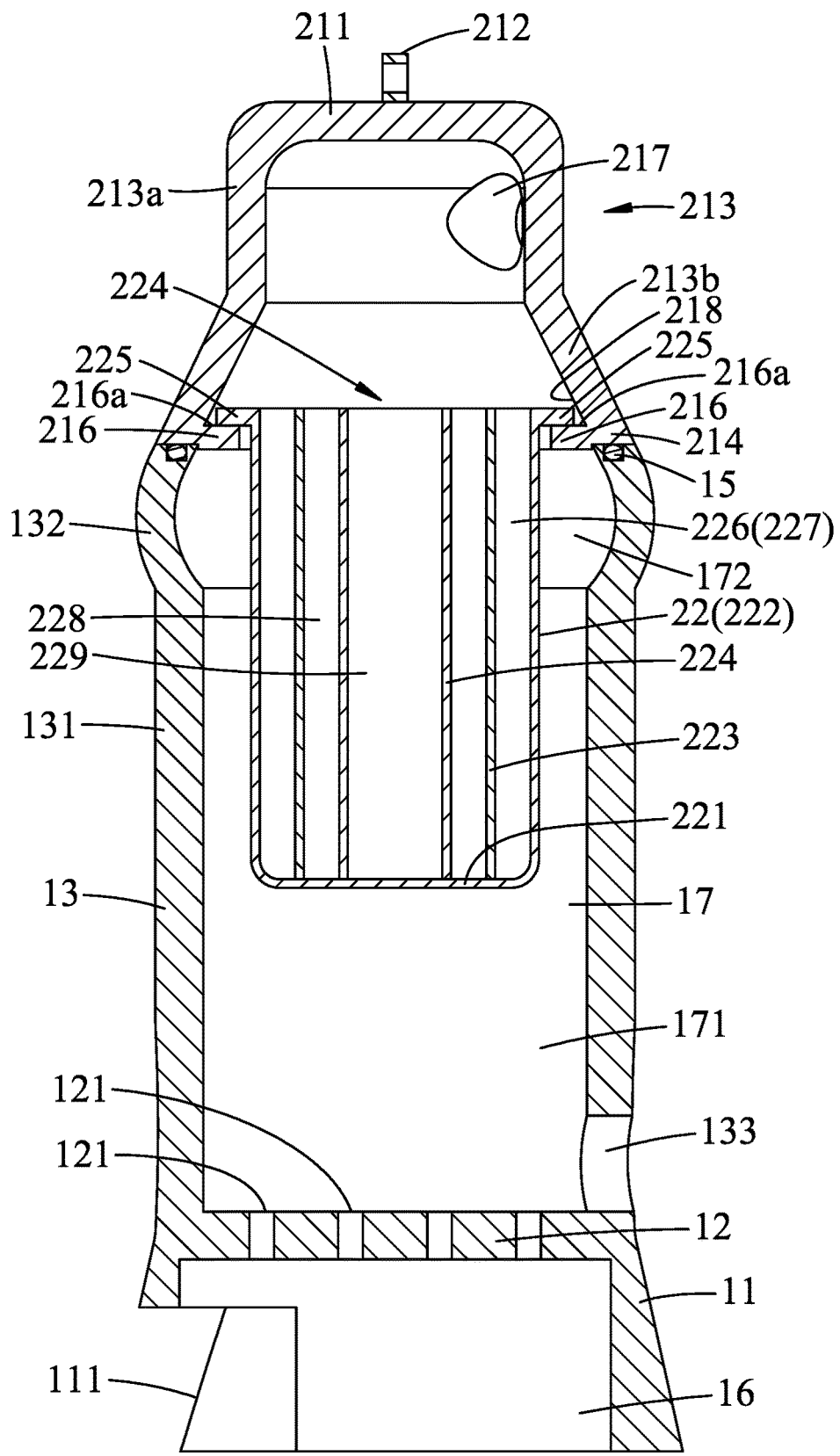
FIG. 4 is a sectional view illustrating the furnace of the embodiment.

Referring to FIGS. 2 to 4, the outer shell 10 has a combustion wall 11, a heating chamber wall 13, a partition wall 12, a combustion chamber 16, and a heating chamber 17. The heating chamber wall 13 extends upwardly from the combustion chamber wall 11. The partition wall 12 extends transversely at a junction of the combustion and heating chamber walls 11, 13. The combustion chamber 16 is defined by the combustion chamber wall 11 and the partition wall 12. The heating chamber 17 is defined by the partition wall 12 and the heating chamber wall 13. The partition wall 12 has a plurality of through holes 121 in communication with the combustion chamber 16 and the heating chamber 17.

In this embodiment, the combustion chamber wall 11 is formed with a convection opening 111 communicating with the combustion chamber 16, and a gas intake hole 112 spaced apart from the convection opening 111 and communicating with the combustion chamber 16.

The heating chamber wall 13 has a tubular portion 131 of uniform cross section with a bottom end connected to the partition wall 12, and an enlarged width portion 132 connected to a top end of the tubular portion 131.

The tubular portion 131 has a vent hole 133 communicating with the heating chamber 17. The vent hole 133 may connect a pressure relief valve (not shown).

The enlarged width portion 132 has a top edge surface 134 and a top annular recess 135. The top edge surface 134 is distal from the tubular portion 131. The top annular recess 135 is indented into the top edge surface 134. Further, the enlarged width portion 132 has a varying width that increases gradually from the tubular portion 131 and thereafter decreases gradually to the top edge surface 134. The heating chamber wall 13 further has a sealing ring 15 received in the top annular recess 135.

The heating chamber 17 has a first heating portion 171 surrounded by the tubular portion 131, and a second heating portion 172 surrounded by the enlarged width portion 132.

The outer shell 10 further has two pawls 14 pivotably disposed on the heating chamber wall 13. Each pawl 14 has a pawl pivot part 141 pivotally connected to the heating chamber wall 13, and a pawl arm 142 connected to the pawl pivot part 141.

Each inner tank 20 has a top cover 21 and a barrel 22.

The top cover 21 removably covers the enlarged width portion 132 of the heating chamber wall 13 and closes the heating chamber 17. The top cover 21 has a top cover panel 211, a hanging loop 212, a surrounding cover wall 213, two hooks 215, and two angularly spaced apart arcuate flanges 216.

The hanging loop 212 is connected to a top end of the top cover panel 211.

The surrounding cover wall 213 extends downwardly from a periphery of the top cover panel 211. The surrounding cover wall 213 has an upper surrounding part 213a connected to the top cover panel 211, and a lower surrounding part 213b extending downwardly and divergingly from the upper surrounding part 213a.

The upper surrounding part 213a has two smoke discharge openings 217 formed therethrough, spaced apart from each other, and communicating with the heating chamber 17. The lower surrounding part 213b has a cover bottom end 214 to seat on top of the enlarged width portion 132 and to seal the heating chamber 17.

The hooks 215 extend radially and outwardly from the surrounding cover wall 213 in opposite directions so that the pawls 14 are respectively engagable with the hooks 215.

The two angularly spaced apart arcuate flanges 216 project inwardly from an inner surface 218 of the cover bottom end 214 and cooperatively define two angularly spaced grooves 219 therebetween. The arcuate flanges 216 respectively have flange upper faces 216a that face toward the top cover panel 211.

The barrel 22 is removably engaged with and hung from the top cover 21 and is disposed in the heating chamber 17. The barrel 22 has a barrel bottom 221 opposite to the top cover panel 211, a surrounding barrel wall 222 extending upwardly from and cooperating with the barrel bottom 221 to define a receiving space 226, a barrel top open end 224 opposite to the barrel bottom 221, and two barrel protrusions 225 extending radially and outwardly from the barrel top open end 224.

As best shown in FIG. 4, the barrel top open end 224 is surrounded by the cover bottom end 214. The barrel protrusions 225 respectively extend to and abut against the flange upper faces 216a of the top cover 21 so that the barrel 22 is hung from the arcuate flanges 216. Through a relative movement between the barrel 22 and the top cover 21, the protrusions 225 are releaseable through the grooves 219 so that the barrel 22 is removable from the top cover 21.

The receiving space 226 of the barrel 22 is configured to receive a biomass material. The smoke discharge openings 217 communicate with the receiving space 226. The barrel 22 further has a plurality of separation walls 223 connected to the barrel bottom 221 and surrounded by the barrel surrounding wall 222. In this embodiment, two separation walls 223 are connected to the barrel bottom 221. The separation walls 223 are spaced apart from each other and divide the receiving space 226 into multiple receiving portions 227. In particular, the separation walls 223 are concentric with each other and respectively have a circular cross section.

Referring back to FIG. 1, the cooling unit 3 includes a cooling pond 31 and a sprinkler 32 disposed in the cooling pond 31. The cooling pond 21 has a drain pipeline 311 and a drain valve 312 connected to drain pipeline 311. The cooling pond 31 has a cooling region 313 to accommodate the inner tank 20 transferred from the outer shell 10 so that the sprinkler 32 can spray cooling water onto the inner tank 20.

Depending on the amount of the cooling water accumulated in the cooling region 313, a user can manually operate the drain valve 312 to drain the cooling water out of the cooling region 313.

The control unit 4 includes a control module 41, a display module 42, a first temperature sensing module 43, a second temperature sensing module 44, a third temperature sensing module 45, a pipeline set 46, and an emergency operating member 47.

The pipeline set 46 includes a first temperature sensing pipeline 461, a second temperature sensing pipeline 462, a furnace wall temperature sensing pipeline 463, a fuel gas entrance 464, a fuel gas pipeline 465, and a flow valve 466. The first temperature sensing pipeline 461 connects the first temperature sensing nodule 43. The second temperature sensing pipeline 462 is connected to the second temperature sensing module 44. The furnace wall temperature sensing pipeline 463 is connected between the heating chamber wall 13 and third temperature sensing module 45. The fuel gas pipeline 465 is connected to the gas intake hole 112 and the fuel gas entrance 464. The flow valve 466 is disposed on the fuel gas pipeline 465. The control module 41 is informationally connected to the first temperature sensing module 43 and the flow valve 466. The emergency operating member 47 is connected to the flow valve 466.

The fuel gas pipeline 465 is used to deliver a feel gas to the combustion chamber 16. In this embodiment, the fuel gas is natural gas.

The collecting unit 5 includes a collection barrel 51, a pressure detector 52, a pressure relief valve 53, a condenser 54, a first collection pipeline 55, a second collection pipeline 56, and an exhaust pipeline 57. The pressure detector 52 is disposed on the collection barrel 51 for detecting the pressure inside of the collection barrel 51. The pressure relief valve 53 is connected between the collection barrel 51 and the pressure detector 52. The condenser 54 is disposed in the collection barrel 51. The first and second collection pipelines 55, 56 are connected to the collection barrel 51. The exhaust pipeline 57 is connected to the first collection pipeline 55 and an exhaust stack (not shown).

Production of biomass vinegar and charcoal in this embodiment will be illustrated hereinafter by using a bamboo material as an example. However, other types of biomass materials can also be used for producing biomass vinegar and charcoal.

In assembly, the barrel protrusions 225 of the barrel 22 are allowed to respectively pass through the grooves 219 and then the barrel 22 is rotated to cause the barrel protrusions 225 to engage with the flange upper faces 216a of the top cover 21.

When the top cover 21 is placed atop of the outer shell 10, and when the pawl arms 142 of the pawls 14 respectively engage the hooks 215 of the top cover 21, the cover bottom end 214 of the top cover 21 is seated on the top edge surface 134 of the enlarged width portion 132, and the sealing ring 15 is disposed between the cover bottom end 214 and the top edge surface 134 to seal the heating chamber 17 for enhancement of heating effect. Afterwards, an end of the first temperature sensing pipeline 461 opposite to the first temperature sensing module 43 is connected to one of the smoke discharge openings 217 of the inner tank 20 in the outer shell 10; the other one of the smoke discharge openings 217 is connected to an end of the first collection pipeline 55 opposite to the collection barrel 51. The other inner tank 20 disposed in the cooling region 313 has one of the smoke discharge openings 217 connected to an end of the second temperature sensing pipeline 462 opposite to the second temperature sensing module 44; an end of the second collection pipeline 56 opposite to the collection barrel 51 is removably connected to the other one of the smoke discharge openings 217 of the inner tank 20 in the cooling region 313.

In this embodiment, the first temperature sensing module 43 has a temperature sensing line (not shown) disposed in the first temperature sensing pipeline 461 to detect a smoke temperature that corresponds to a temperature in the corresponding one of the smoke discharge openings 217 of the inner tank 20 disposed in the outer shell 10; this smoke temperature is referred to as a first inner tank temperature hereinafter. The second temperature sensing module 44 has a temperature sensing line (not shown) disposed in the second temperature sensing pipeline 462 to detect a smoke temperature that corresponds to a temperature in a corresponding one of the smoke discharge openings 217 of the inner tank 20 disposed in the cooling region 313; this smoke temperature is referred to as a second inner tank temperature hereinafter.

A smoke temperature detected by the third temperature sensing module 45 corresponds to a temperature of the heating chamber wall 131 and is referred to as a furnace wall temperature.

The control module 41 can control the flow valve 446 so as to increase the first inner tank temperature to a target temperature level and maintain it at the target temperature level; the target temperature level ranges between 400° C. and 1000° C.

The display module 42 displays the first inner tank temperature, the second inner tank temperature, and the heating chamber wall temperature. The user can operates an operation interface (not shown) of the control module 41 to control the flow valve 466 or to set the inner tank target temperature and heating time. A flow amount of the fuel gas delivered to the combustion chamber 16 is controlled by the flow valve 466 for adjustment of heating temperature.

In this embodiment, the emergency operating member 47 is an emergency stop button that can be activated manually to close the flow valve 46 and to stop delivery of the fuel gas to the combustion chamber 16.

To produce the bamboo vinegar and bamboo charcoal, the bamboo material is placed in the receiving space 226 of the inner tank 20 received in the outer shell 10, and old used wood pieces (not shown) placed in the combustion chamber 16 are burned and generate heat transferring through the through holes 121 to heat the barrel 22 in the heating chamber 17.

When a pressure value in the heating chamber 17 is greater than a tolerance value, part of gases in the heating chamber 17 are released out from the outer shell 10 through the pressure relief valve disposed in the vent hole 133. In other embodiments, during the heating process, part of gases in the heating chamber 17 can be discharged out from the outer shell 10 by an exhaust pipe (not shown) communicating with the vent hole 133.

When the bamboo material in the barrel 22 is heated, an amount of smoke gases pass through the first collection pipeline 55 to the collection barrel 51, and the condenser 54 condenses the smoke into bamboo vinegar in the collection barrel 51. A remaining amount of the smoke gases is discharged from the exhaust pipeline 57 and the exhaust stack (not shown). Meanwhile, the first temperature sensing module 43 detects a temperature of the smoke flowing into the first temperature sensing pipeline 461.

When a pressure value in the collection barrel 51 is greater than a preset pressure value, the pressure relief valve 53 will automatically open to relieve pressure, thereby avoiding the risk of damaging the collection barrel 51 by an overly high pressure. After the bamboo materials are carbonized, the first temperature sensing pipeline 461 and the first collection pipeline 55 are detached from the top cover 21 of the inner tank 20 that is received in the outer shell 10; the inner tank 20 is moved from the outer shell 10 to the cooling region 313 by using a hanging hook (not shown) to connect and lift the hanging loop 212 of the top cover 21 and is then cooled by the sprinkler 32. After the inner tank 20 is placed in the cooling region 313, the second temperature sensing pipeline 462 is connected to one of the smoke discharge openings 217 on the top cover 21, and the second collection pipeline 56 is connected to the other smoke discharge opening 217. Therefore, the collection barrel 51 is connected to the other smoke discharge opening 217 and continuously collects the smoke discharged from the other smoke discharge openings 217. The declining temperature of the inner tank 20 in the cooling region 313 is monitored to decide when the top cover 21 is to open so that the bamboo charcoal in the barrel 22 can be safely unloaded.

As soon as the inner tank 20 together with the carbonized bamboo material is removed from the outer shell 10, a next inner tank 20 loaded with a new batch of bamboo materials can be placed in the outer shell 10 and connected to the first temperature sensing pipeline 461 and the first collection pipeline 55. After the hooks 215 of the next inner tank 20 are respectively engaged with the pawls 14 of the outer shell 10, a subsequent carbonizing operation can be carried out.

In conclusion, the system of the disclosure has the following effects.

1. Because the inner tank 20 after being heated has a relatively high temperature inside thereof, in case of directly opening the top cover 21, a danger of escaping harmful high temperature hot air will be encountered. By removing the hot inner tank 20 from the outer shell 10 and cooling the same in the cooling pond 31, the rate of cooling the hot inner tank 20 is increased and the top cover 21 can be safely opened to unload the carbonized charcoal and to load a new batch of the bamboo materials. In comparison with the prior art carbonization furnace which operates through natural cooling that needs a waiting time cooling, the furnace 1 of the disclosure, which has the inner tank 20 removable from the outer shell 10 and which allows the hot inner tank 20 to be transferred to and cooled in the cooling pond 31, not only permit rapid cooling of the carbonized products, but also enable monitoring of the declining temperature of the inner tank 20 at the same time to learn the time appropriate for opening the top cover 21 and unloading the bamboo charcoal. This increases the production efficiency.

2. Because the separation walls 223 of the barrel 22 are concentric with each other to divide the receiving space 226 into multiple receiving portions 227, pieces of the bamboo materials can be spread without clustering together in the receiving portions 227 so that the surfaces of the bamboo pieces to be heated can be increased for enhancement of heating and carbonization efficiencies.

3. By providing multiple inner tanks 20 which can be removably and exchangeably placed in the outer shell 10 and the cooling ponds 31, after one of the inner tanks 20 heated in the outer shell 10 is unloaded, a next one of the inner tanks 20 can be loaded into the outer shell 10 to proceed with a next carbonization operation without requiring to wait for the former inner tank 20 to cool, thereby increasing the production efficiency.

In the description above, for the purposes of explanation, numerous specific details have been set forth in order to provide a thorough understanding of the embodiment. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what is considered the exemplary embodiment, it is understood that this disclosure is not limited to the disclosed embodiment but is intended to cover various arrangements included within the spirit and scope of the broadest interpretation so to encompass all such modifications and equivalent arrangements.

What is claimed is:

1. A system for producing biomass vinegar and charcoal, comprising:
    a furnace including an outer shell and at least one inner tank removably received in said outer shell,
        said outer shell having a combustion chamber wall, a heating chamber wall extending upwardly from said combustion chamber wall, a partition wall extending transversely at a junction of said combustion chamber wall and said heating chamber wall, a combustion chamber defined by said combustion chamber wall and said partition wall, and a heating chamber defined by said partition wall and said heating chamber wall,
        said at least one inner tank having a top cover removably covering said heating chamber wall and closing said heating chamber, and a barrel removably engaged with and hung down from said top cover and disposed in said heating chamber, said barrel having a receiving space configured to receive biomass, said top cover having two smoke discharge openings communicating with said receiving space;
    a cooling unit including a cooling pond and a sprinkler disposed in said cooling pond, said cooling pond having a cooling region to accommodate said at least one inner tank;
    a control unit including a first temperature sensing module and a first temperature sensing pipeline connecting said first temperature sensing module and one of said smoke discharge openings; and
    a collecting unit including a collection barrel disposed downstream of the other one of said smoke discharge openings, a condenser disposed in said collection barrel, and a first collection pipeline connected to said collection barrel and the other one of said smoke discharge openings;
    wherein, when the biomass in said at least one inner tank is heated, smoke gases pass through said first collection pipeline to said collection barrel, and said condenser condenses the smoke gases to produce biomass vinegar in said collection barrel, and said first temperature sensing module detects a temperature of the smoke flowing into said first temperature sensing pipeline; and
    wherein, after the biomass is carbonized, said first temperature sensing pipeline and said first collection pipeline are detached from said at least one inner tank, and said at least one inner tank is moved to said cooling region to be cooled by said sprinkler.

2. The system as claimed in claim 1, wherein
    said combustion chamber wall is formed with a convection opening communicating with said combustion chamber, and a gas intake hole spaced apart from said convection opening and communicating with said combustion chamber;
    said control unit further includes a fuel gas pipeline connected to said gas intake hole to deliver a fuel gas to said combustion chamber, a flow valve disposed on said fuel gas pipeline, a control module informationally connected to said first temperature sensing module and said flow valve, and an emergency operating member connected to said flow valve; and
    when said emergency operating member is activated, said flow valve is closed to stop delivery of the fuel gas to said combustion chamber.

3. The system as claimed in claim 1, wherein:
    said control unit further includes a second temperature sensing module and a second temperature sensing pipeline connected to said second temperature sensing module;
    said collecting unit further includes a second collection pipeline connected to said collection barrel; and
    when said at least one inner tank is moved to said cooling region, said second temperature sensing pipeline is removably connected to one of said smoke discharge openings on said top cover, and said second collection pipeline is removably connected to the other one of said smoke discharge openings.

4. The system as claimed in claim 1, wherein:
said top cover has a top cover panel, a surrounding cover wall extending downwardly from a periphery of said top cover panel and having a cover bottom end to seat on top of said heating chamber wall and to seal said heating chamber, and two angularly spaced apart arcuate flanges that project inwardly from an inner surface of said cover bottom end and that cooperatively define two angularly spaced grooves therebetween, said arcuate flanges respectively having flange upper faces that face toward said top cover panel;
said barrel has a barrel bottom opposite to said top cover panel, a surrounding barrel wall extending upwardly from and cooperating with said barrel bottom to define said receiving space, a barrel top open end opposite to said barrel bottom, and two barrel protrusions extending radially and outwardly from said barrel top open end;
said barrel top open end is surrounded by said cover bottom end, said barrel protrusions respectively extend to and abut against said flange upper faces so that said barrel is hung from said arcuate flanges; and
through a relative rotation movement between said barrel and said top cover, said protrusions are releasable through said grooves from said arcuate flanges so that said barrel is removable from said top cover.

5. The system as claimed in claim 4, wherein said surrounding cover wall has an upper surrounding part connected to said top cover panel, and a lower surrounding part extending downwardly from said upper surrounding part and having said cover bottom end, said smoke discharge openings being formed through said upper surrounding part and spaced apart from each other.

6. The system as claimed in claim 4, wherein said heating chamber wall has a top edge surface, a top annular recess indented into said top edge surface, and a sealing ring disposed between said cover bottom end and said top edge surface, said sealing ring being received in said top annular recess.

7. The system as claimed in claim 6, wherein:
said top cover further has two hooks extending radially and outwardly from said surrounding cover wall in opposite directions; and
said outer shell further has two pawls pivotably disposed on said heating chamber wall and respectively engageable with said hooks.

8. The system as claimed in claim 4, wherein said barrel further has a plurality of separation walls connected to said barrel bottom and surrounded by said barrel surrounding wall, said separation walls being spaced apart from each other and dividing said receiving space of said barrel into multiple receiving portions.

9. The system as claimed in claim 8, wherein said separation walls are concentric with each other and respectively have a circular cross section.

10. The system as claimed in claim 4, wherein said heating chamber wall has a tubular portion of uniform cross section with a bottom end connected to said partition wall, and an enlarged width portion connected to a top end of said tubular portion, said enlarged width portion having a top edge surface distal from said tubular portion and a varying width that increases gradually from said tubular portion and thereafter decreases gradually to said top edge surface.

11. The system as claimed in claim 10, wherein said tubular portion has a vent hole communicating with said heating chamber.

12. The system as claimed in claim 1, wherein said control unit further includes a third temperature sensing module, and a furnace wall temperature sensing pipeline connected between said heating chamber wall and said third temperature sensing module.

* * * * *